July 22, 1969     R. H. APPELDORN     3,457,400
APPARATUS AND METHOD FOR DIRECTING A BEACON
TOWARD A LIMITED VIEWING AREA
Filed Aug. 10, 1966
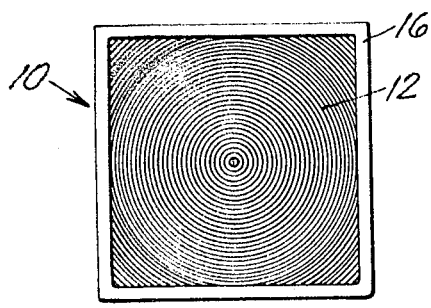
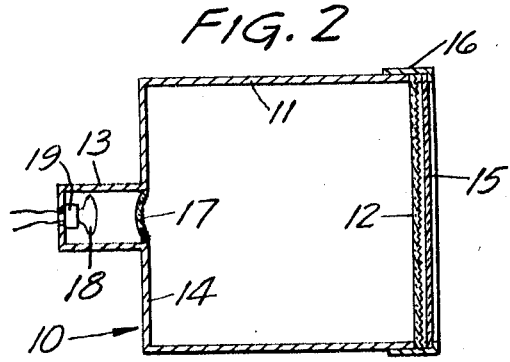
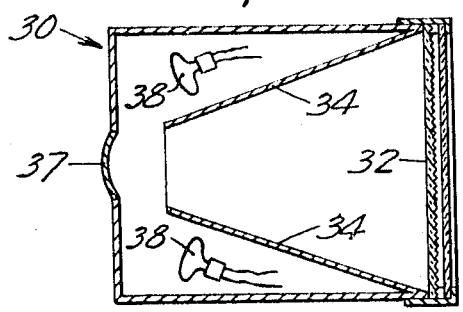
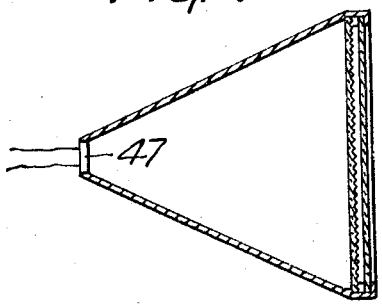
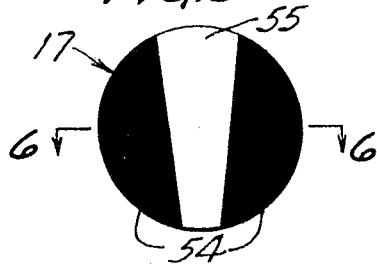
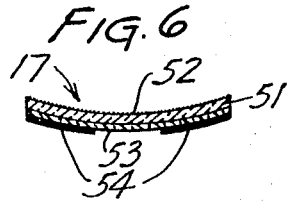
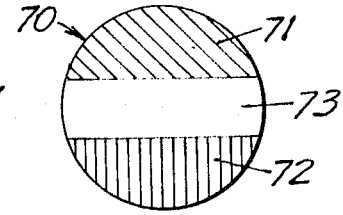
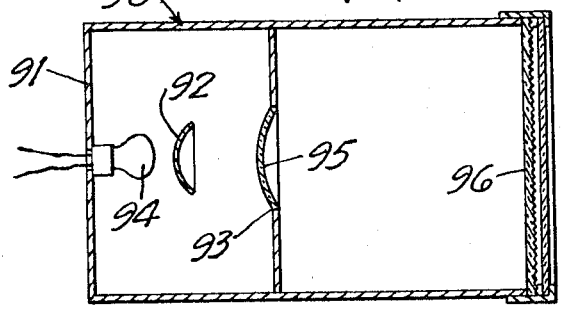
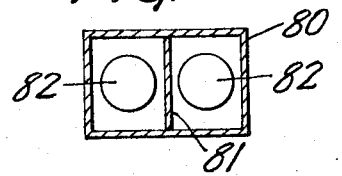
INVENTOR.
ROGER H. APPELDORN
BY
Carpenter, Kinney & Coulter
ATTORNEYS

United States Patent Office 3,457,400
Patented July 22, 1969

3,457,400
APPARATUS AND METHOD FOR DIRECTING A BEACON TOWARD A LIMITED VIEWING AREA
Roger H. Appeldorn, White Bear Lake, Minn., assignor to Minnesota Mining and Manufacturing Company, St. Paul, Minn., a corporation of Delaware
Filed Aug. 10, 1966, Ser. No. 571,639
Int. Cl. F21m 7/00, 13/00; F21v 13/04
U.S. Cl. 240—41.1           10 Claims

ABSTRACT OF THE DISCLOSURE

A highway beacon which provides diffuse illumination from an aperture located at the focus of the display lens. A diffusing plate is used to either reflect or transmit light to the aperture. A method is also shown to mask the diffusing plate to limit the projected light to a predetermined viewing area.

---

This invention relates to display devices and methods of making and using the same. Illuminated display devices incorporating the principles of the invention have widespread and important applicability in the field of beacons and markers for highways, waterways and airways; and the invention, while not limited thereto, will accordingly be described primarily in terms of such applications.

The invention makes possible a beacon or signal of simplified construction, having unique high visibility and critically exact directionality. Visibility is attained primarily by effective utilization of large area viewing surfaces rather than by empolying a high intensity light source. Directionality is achieved at the source, and areas at which the beacon is to be visible may be easily and precisely determined.

As a demonstration of results attainable in the practice of the invention, a beacon, employing as the source of light a small flashlight bulb operated from small dry cells, has been found to be easily visible at a distance of nearly ten miles under twilight conditions such that a red aircraft warning beacon operating with a 100-watt bulb could not be seen. Again, a beacon using adjacent red and green filters and viewed from various distances was found by the observer to change in appearance from full red to full green during movement of only about one-fourth of a degree of arc across the line of color demarkation.

It has now been found possible to achieve novel, useful and unexpected results, such for example as have been indicated in the foregoing illustrations, by combining with a large diameter display lens, preferably in the form of a flat Fresnel or echelon condensing lens having a series of prismatic light-refracting ridges at increasing distances from the center, lighting means providing modifiable diffuse illumination of said lens from points substantially at its focus. The invention will now be further described and illustrated in connection with the appended drawings, in which FIGURE 1 is a front elevation and FIGURE 2 a side elevation in section of an illustrative form of the device, FIGURES 3 and 4 are sectional side elevations of modified forms of the device of FIGURES 1 and 2, FIGURE 5 is a rear elevation and FIGURE 6 a sectional side elevation of a patterned diffusion plate as used in the device of FIGURES 1 and 2, FIGURE 7 is a rear elevation of a diffusion plate having a different pattern, FIGURE 8 is a front elevation of another form of light source, and FIGURE 9 is a sectional side elevation of a further illustrative form of beacon employing the principles of the invention.

The beacon 10 of FIGURES 1 and 2 consists of a larger housing or enclosure 11 having a flat display lens 12 over the open front and a smaller housing or enclosure 13 attached to the centrally open rear wall 14. The ridged surface of the display lens 12 faces outwardly. It is covered with a protective transparent pane 15 of glass or plastic and is bordered with a supporting frame 16. The open center of the rear wall 14 is covered with a light-transmissive diffusion plate 17 which is illuminated with light from a bulb 18 supported by a socket 19 within the smaller housing 13. The light-diffusing surface of the plate 17 is at or very close to the focus of the lens 12.

The beacon 30 of FIGURE 3 is similar except that the diffusion plate 37 is opaque and light is obtained from sources 38 located forwardly of the plate. Shields 34 mask the lens 32 from rays of light coming directly from the lamps 38 and are useful where an accurate boundary is desired for the viewing area.

A further modification is illustrated in FIGURE 4 wherein the diffusion plate 57 is a self-luminous source of uniform diffuse illumination, such for example as a flat electroluminescent panel.

A feature of the devices of FIGURES 1–4 is that light from the diffusion plate area substantially uniformly illuminates the entire viewing area of the display lens. Directed diffusion, with none or very little of the total light from the plate reaching areas outside of the lens, is preferred and may be obtained by suitable shaping of the plate surface, but fully acceptable results are more economically obtained by simple micro-roughening of the plate surface, as for example by vapor honing techniques. A useful degree of directed diffusion may be obtained by these means, only a minor proportion of the light being lost by lateral diffusion beyond the area of the display lens.

Another important feature is that the light-diffusing surface is substantially at the focus of the display lens. Flat diffusion plates of relatively small area adequately meet this requirement, but larger plates must be of appropriately rounded contour. By the focus is meant the point behind the display lens at which the light rays from a point source in front of the lens will meet. Where the source is sufficiently distant and is on the axis of the lens, the rays will be focused at a point which defines the focal length of the lens.

A presently preferred diffusion plate 17 is a uniformly thin segment of a hallow sphere having a radius of approximately one-half the focal length of the display lens. For sizes up to about six inches the ordinary chemical laboratory watch glass is sufficiently accurate for many applications. The inner or concave surface is provided with an extremely fine surface roughness, e.g. by vapor honing, to serve as the light-diffusing surface; and portions of the outer or convex surface are colored or opacified as may be desired. The two positions may be reversed, but the indicated positions are preferred since the mask is then more conveniently applied. Lacquers based on dyed or pigmented epoxy resins are particularly useful as coloring or masking coatings, both for adhesion to the glass and for resistance to elevated temperatures.

The combination of a lens 12 and illuminated diffusion plate 17 as shown in FIGURE 2 provides the elements of a camera obscura. Accordingly it becomes possible to place the device in the position of a directional beacon, for example at a highway intersection, and, with the lamp housing removed, to outline appropriately those sections of the diffusion plate corresponding to those areas of the highway or intersection from which a signal is to be made visible. Any desired number or arrangement of such sections may be outlined. In the example illustrated in FIGURES 5 and 6, the diffusion plate 17, from the beacon of FIGURE 2, and consisting of a thin semispherical glass disc 51 having a micro-roughened light-diffusing concave surface 52 and a transparent color filter film 53 over the convex surface, is masked at side areas 54 to leave a wedge-shaped central transparent colored segment 55 representing the view of a section of one lane of a highway. When the lamp housing 13 is now replaced and the bulb 18 lighted, the full face of the lens 12 will appear lighted to an observer located anywhere along the said section; whereas to anyone at either side of the indicated lane, the beacon will appear dark. The combination of uniform illumination and large viewing area provides an element of conspicuousness not hitherto attainable with anything like the low power input at which the device may be operated.

If desired, the interior of the chamber 11 may be finished in white so that the lens will appear dimly lighted from points near the beacon and outside of the predetermined viewing area; but full lighting will be apparent only from within said area.

Another example is shown in FIGURE 7. In this instance two identically colored outer zones 71, 72 of the diffusion plate 70 are separated by differently colored central zone 73. With the plate 70 inserted in the device of FIGURE 2 in place of the plate 17, there is provided a central viewing zone from within which an observer may see the entire surface of the display lens illuminated in the color of the central area 73. At either side the observed color will be that of areas 71 and 72. In the position shown for the diffusion disc 70 the device therefore may serve as an approach slope indicator for aircraft, whereas with the strip 73 in a vertical position the device is useful as a waterways beacon or traffic direction light.

Additional versatility may be provided by including more than one light source, as indicated in connection with FIGURE 8 wherein the housing 80 is separated into two compartments by a central partition 81 and each containing a light source 82. A diffusion plate, not shown, may for example be differently colored over the two sources, and the latter then lighted alternately as desired.

Versatility may also be increased by incorporating the lens and source elements of two, or even three separate beacons in a single unit, for example in a highway intersection beacon where the two units are visible from areas at right angles to each other.

Diffuse illumination is provided in the beacon 90 illustrated in FIGURE 9 in the absence of a diffusion plate. The interior walls of the rearward chamber 91 are made light-diffusing, for example by coating with flat white paint, and a translucent shield 92 is supported between the lamp 94 and the opening 93. A transparent plate 95 is preferably disposed across the opening 93 and at the focus of the lens 96. The combination of chamber 91, lamp 94, and shield 92 in effect represents an integrating sphere, so that the lens 96 is diffusely illuminated from all points within the compass of the opening 93 and at the focus of the lens. The edges of the opening 93 may serve to define the area from which light reaches the lens, in which case the plate 95 may be omitted. Where present, the plate serves as a convenient support for color filter coatings of for opaque masking coatings serving to identify or outline illumination areas corresponding to specific predetermined viewing areas, as described in connection with FIGURES 5-7.

In each of these applications the transition, between areas from which the display lens appears fully illuminated and adjacent areas from which it appears either completely dark or fully illuminated but of a different color, is surprisingly abrupt. As an illustration, using the restricted-area diffusion plate 17 of FIGURES 5 and 6 in the beacon of FIGURES 1 and 2 it is entirely possible to witness complete change between the completely lighted and the completely dark condition at the beacon on moving through only about one-quarter of a degree of arc across the appropriate boundary area facing the beacon.

Electric lamps employing incandescent filaments are preferred as sources of illumination, but any other convenient source, including flame-heated incandescent mantles or the like, may be substituted with good results. A feature of the device described in connection with FIGURE 3 is that in the absence of a self-contained source it becomes retro-reflective so that light directed to the device from within the normal viewing area is re-directed to the point of origin. An approaching vehicle may thus provide its own warning signal in the event of a power failure at the beacon. On the contrary, the device shown in FIGURE 9 shows almost no retroreflection.

Beacons having small angular visibility and employing diffusion plates of relatively small area require suprisingly low power to provide fully adequate intensity of illumination. Beacons visible over larger areas require increased power, but the amount of power required may be surprisingly low for the degree of conspicuousness achieved, primarily because of the uniformity of intensity and the effective utilization of the entire area of the display lens. The visibly dimmest area seen on the viewing surface may consistently be made to show better than one-half the intensity of the brightest area in devices of this invention; whereas a 1-to-6 ratio has heretofore been considered exceptional in the traffic signal industry.

The lens 12 of FIGURE 2 is a Fresnel, or echelon, or step lens. It represents a preferred form, particularly for devices of larger dimensions, although simple planar-convex or double convex or other equivalent lens forms are not prohibited where their greater weight, increased thickness, and less desirable optical properties may be tolerated.

The step wedge surface of the Fresnel lens may be placed toward the interior of the chamber 11, the outer protective plate then being unnecessary. It is presently preferred to use a single flat Fresnel lens in the position shown for lens 12 in FIGURE 2, i.e. with the step wedge surface facing outwardly, and covered by a flat transparent protective plate 15, particularly where a wide angle lens, having a higher ratio of effective diameter to focal length, is desired, as for example where minimum depth of the device is an advantage. Combinations of Fresnel lenses placed in face-to-face association permit still wider angles and simultaneously provide protection for the wedge surfaces. The Fresnel lens or lenses may be rounded rather than flat if desired for special optical properties, for example to limit surface reflections.

Internal or external shutters, masks, filters or other control devices may be supplied, for the purpose of providing desired variations in areas or patterns as viewed at the display surface. Multiples of the devices, controlled by external timer or switch means, may be used for such applications as traffic control. Self-contained and self-powered collapsible units are particularly useful for temporary traffic control.

The invention will now be further described in terms of a specific illustrative example and based on the device as illustrated in FIGURE 2. The box 11 is 12 x 12 x 12 inches. The lens 12 has a focal length of 12 inches and consists of a flat plate of methyl methacrylate polymer embossed with a step lens pattern having 50 ridges per inch along the radius. The box 13 is 1 x 1 x 1 inch and covers a 1 x 1 inch opening at the center of the side of the larger box 11. The interior of the smaller box 26 is painted white. A 3.6 watt flashlight bulb 18 is mounted within the box 13 by means of a suitable base 19. The diffusion plate 17 in this instance consists of a thin film of light-diffusing embossed or roughened cellulose acetate smoothly covering the opening and adhered to the surrounding wall of the box 11.

As a test of its effectiveness, a device as just described was mounted in position for viewing and the bulb was connected to a six-volt battery. Under twilight conditions, observers viewing the area from a convenient distance of 9.3 miles had no difficulty in seeing the lighted beacon from any point within a lateral spread of three-quarters of a mile, whereas it was invisible from points just outside of such area. At the same time it was found impossible to distinguish a lighted aircraft warning signal adjacent the test beacon and having a 100-watt source within a ruby glass cover.

The location of the color filter is conveniently at the surface of the diffusion plate as hereinbefore described, and this location is essential where two or more colors are to be used; but other locations are acceptable where single colors are involved. One or more filter elements may be placed at any position between the light source and the diffusion plate, or between the plate and the display lens, or in front of the display lens; or the plate or lens may itself be colored; or the light source may be selected to emit rays of desired color or wavelength.

Very wide as well as very narrow viewing angles are made possible with beacons made according to the principles of the invention. Control of the viewing angle is achieved without the use of external louvers, baffles or masks. In the example hereinbefore described, a one-inch diffusion plate with a 12-inch display lens having a focal length of 12 inches is visible over approximately 4½ degrees of arc. With the same lens, a diffusion plate having a diameter of six inches (and a radius of curvature of approximately six inches, or one-half the focal length of the lens) gives a beacon which is visible over approximately 30 degrees of arc. In both cases the cut-off between lighted and unlighted areas is abrupt. A considerable increase in power input is required to attain over the wider angle an intensity equivalent to that attained over the narrower angle, but the large viewing surface and the uniform intensity of illumination over that surface make possible significant reductions in power input as compared with previously known signals and beacons designed for similar applications.

The novelty and advantages of the device of the present invention as described hereinbefore become further apparent on consideration of prior art devices as shown, for example in U.S. Patents Nos. 1,635,863, 2,420,976, and 2,559,415. In none of these patents is there disclosed a sign or beacon presenting uniform illumination over the entire viewing face to an observer located at any point within substantially the entire view area. The prior art apparatus is relatively complicated, requires a high degree of precision, and in no case incorporates a diffusion plate or other source of diffuse light located at the focus of the viewing or display lens.

What is claimed is as follows:

1. A display device for displaying a fully uniformly illuminated viewing surface to an observer located within a predetermined viewing area forwardly of said device and comprising: a condensing lens defining said viewing surface and having a focus; aperture-defining means for outlining a restricted area corresponding to said viewing area and with all aperture-defining edges substantially at said focus; and lighting means for providing diffuse illumination to said lens from said focus and from the entire aperture.

2. The device of claim 1 wherein the display lens is a Fresnel lens.

3. The device of claim 1 wherein is included at least one color filter substantially at said focus and covering at least a portion of said aperture.

4. The device of claim 1 wherein said lighting means includes a light-diffusing surface substantially at said focus and a source of light forwardly of said surface.

5. The device of claim 1 wherein said lens is a Fresnel lens and wherein is included a light-transmitting plate member substantially at said focus and a source of light rearwardly of said plate.

6. The device of claim 1 wherein is included a light-transmitting plate member substantially at said focus and a source of light rearwardly of said plate.

7. The device of claim 6 wherein said plate is transparent and said source is a source of diffuse light.

8. The device of claim 6 wherein said plate is light-diffusing.

9. The device of claim 6 wherein said aperture-defining means includes opaque masking means disposed on said plate.

10. Method of directing a display device toward a predetermined limited viewing area within the range of its total possible viewing area and wherein said device comprises a condensing lens defining the viewing surface and a light-transmitting plate positioned substantially at the focus of said lens, comprising establishing at said plate a visible light-image of said total viewing area and then placing masking means about the portion of said light-image corresponding to said limited viewing area and with at least the edges of said masking means substantially at the focus of said lens.

References Cited

UNITED STATES PATENTS

| | | | |
|---|---|---|---|
| 1,397,822 | 11/1921 | Peters | 240—46.45 |
| 1,507,367 | 9/1924 | Edelstein | 240—41.1 |
| 1,635,863 | 7/1927 | Schulz. | |
| 1,669,740 | 5/1928 | Dewey | 240—41.3 |
| 1,682,387 | 8/1928 | Lewis | 240—41.3 |
| 1,845,628 | 2/1932 | Roth | 240—41.1 |
| 2,366,356 | 1/1945 | Rolph | 240—106.1 |
| 2,420,976 | 5/1947 | Potter. | |
| 2,559,415 | 7/1951 | Field et al. | |
| 2,441,877 | 5/1948 | Flett | 88—24 |

NORTON ANSHER, Primary Examiner

WAYNE A. SIVERTSON, Assistant Examiner

U.S. Cl. X.R.

240—41.3, 46.59